United States Patent
Cazals et al.

(10) Patent No.: US 8,876,044 B2
(45) Date of Patent: Nov. 4, 2014

(54) AIRCRAFT WITH YAW CONTROL BY DIFFERENTIAL DRAG

(75) Inventors: Olivier Cazals, Daux (FR); Thierry Druot, Saint Jean (FR)

(73) Assignee: Airbus Operations S.A.S. (FR)

( * ) Notice: Subject to any disclaimer, the term of this patent is extended or adjusted under 35 U.S.C. 154(b) by 119 days.

(21) Appl. No.: 12/847,108

(22) Filed: Jul. 30, 2010

(65) Prior Publication Data
US 2011/0024556 A1    Feb. 3, 2011

(30) Foreign Application Priority Data
Aug. 3, 2009   (FR) ...................................... 09 55454

(51) Int. Cl.
*B64C 9/00* (2006.01)
*B64C 5/08* (2006.01)
*B64C 23/06* (2006.01)

(52) U.S. Cl.
CPC ............. *B64C 23/065* (2013.01); *Y02T 50/164* (2013.01)
USPC .............................................. 244/87; 244/91

(58) Field of Classification Search
USPC ................................ 244/87, 91, 12, 183, 184
See application file for complete search history.

(56) References Cited

U.S. PATENT DOCUMENTS

| | | | | |
|---|---|---|---|---|
| 2,279,615 A * | 4/1942 | Bugatti | ......................... | 244/217 |
| 2,434,341 A * | 1/1948 | Anderson | ....................... | 244/217 |
| 2,557,829 A * | 6/1951 | Lavelle | ........................... | 244/204 |
| 2,612,329 A * | 9/1952 | Crandall et al. | .............. | 244/217 |
| 2,697,568 A * | 12/1954 | Powers | ........................... | 244/87 |
| 3,456,904 A * | 7/1969 | Dorand | .......................... | 244/207 |
| 3,575,363 A * | 4/1971 | Jenny et al. | ..................... | 244/13 |
| 4,003,533 A * | 1/1977 | Carter et al. | .................... | 244/217 |
| 4,455,004 A * | 6/1984 | Whitaker, Sr. | ............. | 244/90 R |
| 4,566,657 A * | 1/1986 | Grow | ............................. | 244/215 |
| 5,570,859 A * | 11/1996 | Quandt | ......................... | 244/213 |
| 5,895,015 A * | 4/1999 | Saiz | ............................... | 244/215 |
| 5,988,563 A * | 11/1999 | Allen | ............................. | 244/49 |
| 6,079,672 A * | 6/2000 | Lam et al. | ..................... | 244/217 |
| 6,491,261 B1 * | 12/2002 | Blake | ............................ | 244/213 |
| 6,554,229 B1 * | 4/2003 | Lam et al. | ..................... | 244/217 |
| 2004/0155146 A1 | 8/2004 | Wyrembek et al. | | |

(Continued)

FOREIGN PATENT DOCUMENTS

| | | | | |
|---|---|---|---|---|
| DE | 3415976 A1 | 10/1985 | | |
| GB | 002017020 A | * 9/1979 | ..................... | 244/87 |
| WO | WO03000547 A1 | 1/2003 | | |

OTHER PUBLICATIONS

French Search Report and Written Opinion dated Apr. 15, 2010.

*Primary Examiner* — Philip J Bonzell
*Assistant Examiner* — Marc Burgess
(74) *Attorney, Agent, or Firm* — Lerner, David, Littenberg, Krumholz & Mentlik, LLP

(57) ABSTRACT

An aircraft having an elongated fuselage and a lifting surface fastened to the fuselage. The aircraft has a device for controlling the torque around the yaw axis GZ of the aircraft in which aerodynamic forms that have devices to generate aerodynamic drag are fastened to each end of the lifting surface at non-zero distances from each side of a vertical plane of symmetry XZ of the aircraft. The drag-generating devices are commanded to produce a different aerodynamic drag at each of the two ends to generate a yaw torque on the aircraft. The aerodynamic forms, for example, have winglets improving the aerodynamics of the lifting surface, and are provided with aerodynamic drag generators.

9 Claims, 7 Drawing Sheets

(56) References Cited

U.S. PATENT DOCUMENTS

| | | | |
|---|---|---|---|
| 2004/0155157 A1* | 8/2004 | Bray | 244/198 |
| 2005/0116116 A1* | 6/2005 | Morgenstern | 244/214 |
| 2008/0308683 A1 | 12/2008 | Sankrithi et al. | |

* cited by examiner

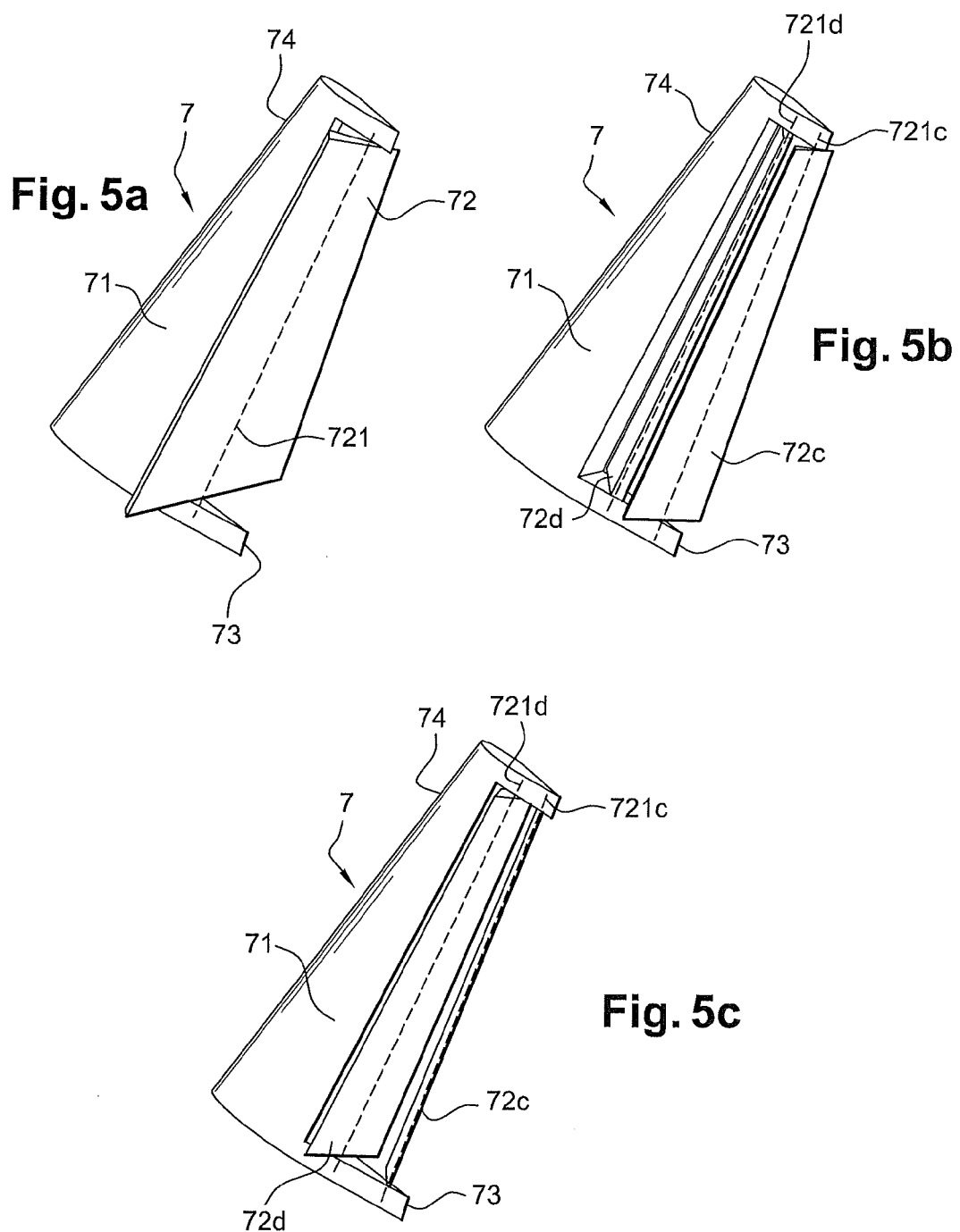

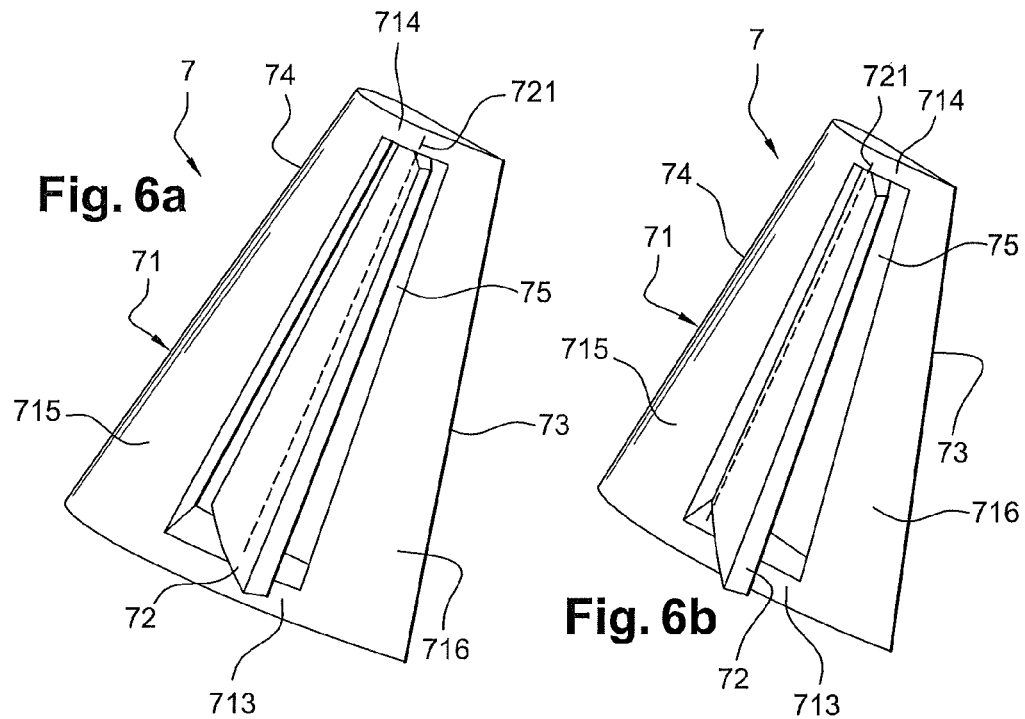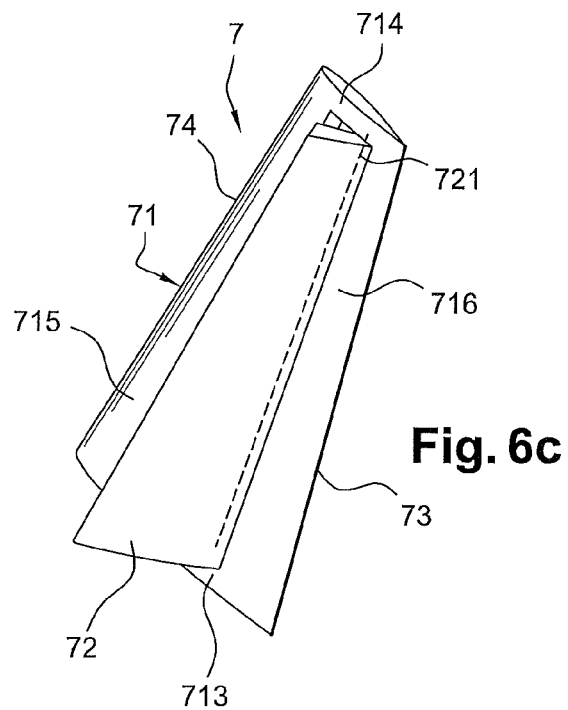

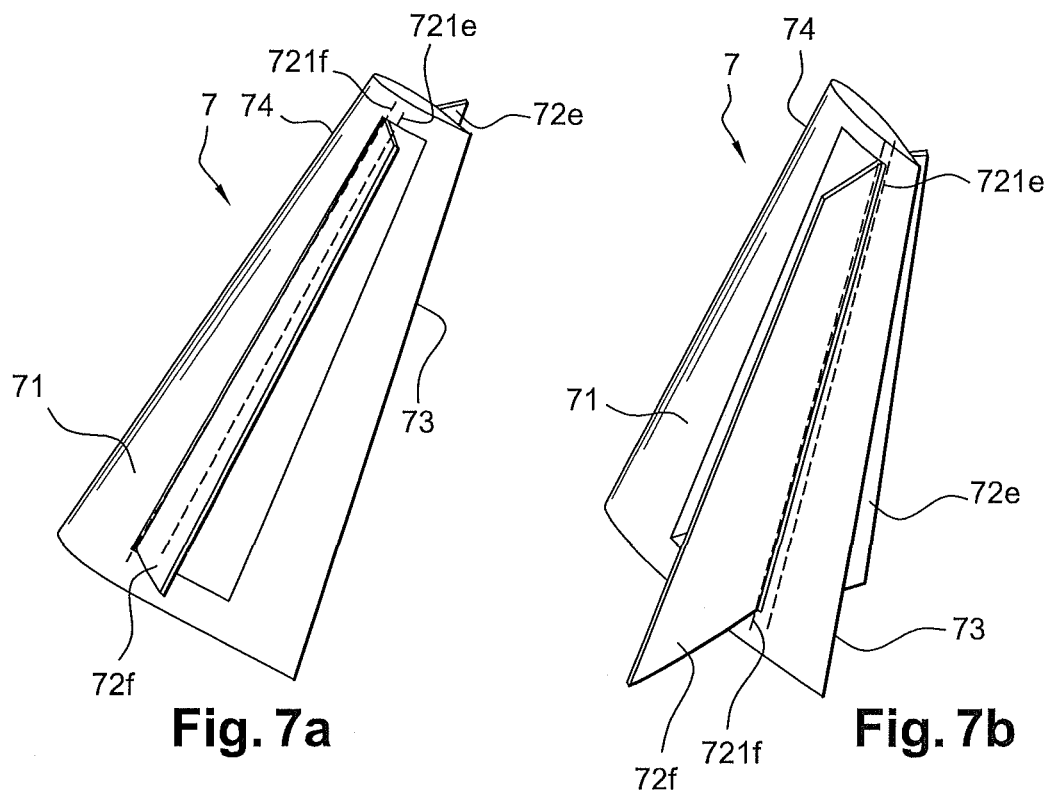
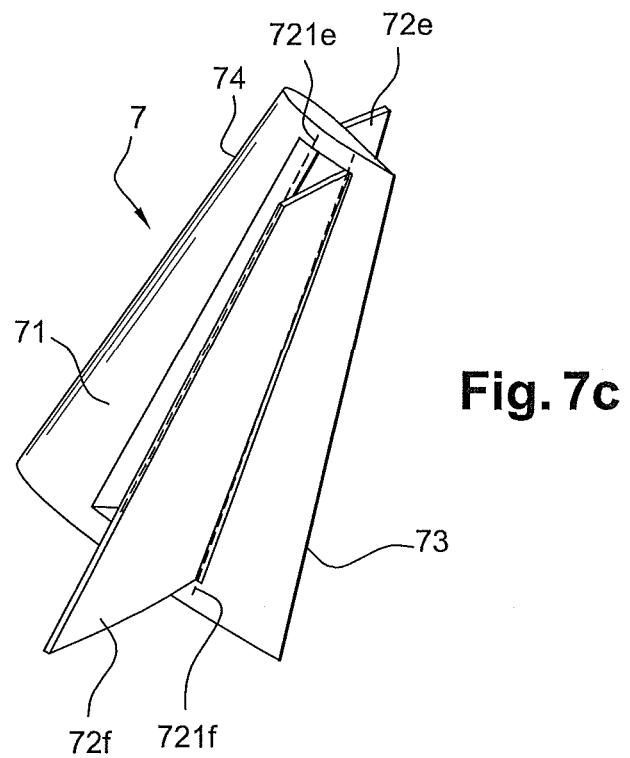

AIRCRAFT WITH YAW CONTROL BY DIFFERENTIAL DRAG

CROSS-REFERENCE TO RELATED APPLICATIONS

This application claims priority to and the benefit of French Application No. 09 55454 filed on 3 Aug. 2009, the disclosures of which are incorporated by reference in its entirety.

BACKGROUND

The aspects of the disclosed embodiments are in the field of transport aircraft with slender wings such as civil or military transport aircraft.

More specifically the aspects of the disclosed embodiments relate to an aircraft whose control mechanism for balance and motions of the aircraft around the yaw axis is provided for at least in part by a control of the drag elements arranged on the wingtips.

SUMMARY

To ensure control of the motions of an aircraft around its center of gravity, necessary for piloting the aircraft and for its trajectory, specialized aerodynamic rudders are usually called upon that act on the motions of the aircraft by creating local lift forces: ailerons or wing lift spoilers for motions around the roll axis, depth control of the horizontal stabilizers for motions around the pitch axis, and direction control of the rudder for motions around the yaw axis.

In other methods, for example on some military aircraft, it is also known how to make use of an orientable engine thrust to produce thrust force components of the engines, ensuring control of the aircraft around different axes of the aircraft by itself or in combination with the aerodynamic controls.

Most modern aircraft with conventional architecture, i.e. that have an elongated fuselage 2 determining the principal axis of the aircraft, provided with a slender wing 3 fastened to the fuselage in a central section of the fuselage and with a tail fin assembly 4, 5 fastened to the rear of the fuselage as shown on the aircraft 1 of FIG. 1, are also provided at the wingtips with wingtip aerodynamic surfaces 6 inclined relative to the wing, often called winglets, that have the essential objective of improving the performance of the wing, in particular by reducing the cruising drag of the wing.

In some cases these wingtip surfaces are movable or are provided with movable sections, for example to act on the twisting of the wing as proposed in the patent EP 1 375 342, or to form airfoils and direction controls when the configuration of the wing is much to the rear relative to the aircraft, depending on the position of the wing on the fuselage and the back sweep of the wing, for example in a flying wing configuration.

In the case of a conventional configuration as illustrated in FIG. 1, in which the wing is located in a central position of the fuselage, an area in which the center of gravity of the aircraft is also located, movable sections of the wingtip aerodynamic surfaces are ineffective for acting on the motions of the aircraft around the yaw axis because of their weak longitudinal lever arms relative to the center of gravity.

The purpose of the disclosed embodiments is to make the best of the lever arm of consequence relative to the center of gravity of the aircraft, of a device positioned at the extremities of a slender lifting surface such as a wing or a conventional horizontal fin or canard of an aircraft to produce control of the aircraft around the yaw axis.

The aircraft of the disclosed embodiments in a known fashion has a fuselage and at least one lifting surface, essentially horizontal in a frame of reference of the fuselage, fastened to the fuselage.

Distant from the vertical plane of symmetry XZ of the aircraft, fastened on each side of the fuselage, aerodynamic forms are fastened to the lifting surface(s) that have devices for generating aerodynamic drag controlled by a device for controlling the torque around the yaw axis GZ to produce different aerodynamic drag between the two sides, left and right, of the aircraft to produce the desired yaw torque on the aircraft around the yaw axis GZ.

To limit the cruising drag and to take advantage of means used on aircraft, each aerodynamic form has at least one aerodynamic surface, or winglet, inclined relative to a horizontal plane XY of the aircraft plane of reference, incorporating a generator of aerodynamic drag whose aerodynamic drag is modulated as a function of orders received from the device for controlling the torque around the yaw axis GZ.

The winglets are advantageously winglets on the lifting surface extremities with dimensions and geometries adapted to the lifting surface to diminish the aerodynamic drag that this lifting surface would have without the presence of the winglets, when the generators of aerodynamic drag are in a position in which a minimal aerodynamic drag is desired, in other words a position called the zero-setting of the drag generators.

In a preferred form of embodiment adapted to the geometry and the structure of the winglets, each aerodynamic drag generator has at least one movable flap hinged on a fixed structure of the winglet in question, and the movable flap(s) in the zero-setting position together with the fixed structure of the winglet form or forms the geometry that the winglet would have if it were deprived of the aerodynamic drag generator.

When not in the zero setting, the movable flap or flaps then generate an aerodynamic drag that is a function of the setting angles of the movable flaps.

For mechanical installation reasons, each flap is advantageously hinged to a structural part of the winglet that is fixed relative to the lifting surface at the end of which it is held, or relative to the device fastened to the lifting surface to which the winglet is fastened, around an axis of rotation along a span of the winglet between a root rib of the winglet of the side of the fastened end of the winglet and an end rib of the winglet.

Different embodiments of the movable flaps put to use by the aerodynamic drag generator are proposed to be able to respond to diverse constraints of installation and of desired performance:

- a winglet on each side of the aircraft has at least one movable flap of the aerodynamic drag generator hinged close to a front edge of said movable flap on a side of a leading edge of the winglet;
- a winglet on each side of the aircraft has at least one movable flap of the aerodynamic drag generator hinged closed to a rear edge of said movable flap on a side of a trailing edge of the winglet;
- a winglet on each side of the aircraft has at least one movable flap of the aerodynamic drag generator hinged in a mid-section of said movable flap;
- the movable flap or flaps of the aerodynamic drag generators are hinged on the winglet behind a rear spar of the fixed structural part of the winglet;
- the movable flap or flaps of the aerodynamic drag generators are hinged in an opening across the winglet delimited toward the front by a section of leading edge of the fixed structural section of the winglet, toward the rear by a section of trailing edge, toward the root by a root rib, and toward the extremity by an end rib of the fixed structural part of the winglet;

the movable flap or flaps of the aerodynamic drag generators are hinged essentially at an external surface of the winglet in which said movable flaps are incorporated by embedment at zero setting.

To integrate the drivers in the limited volume of the winglet, the movable flap or flaps are driven in rotation advantageously by a driver or drivers, for example rotating drivers arranged in the fixed structural section of the winglet (7) next to the root rib and/or the end rib, with the use of drivers close to each of these ribs permitting the dimensions of the drivers to be reduced, and if necessary to make power and control circuits of these drivers independent so as to produce an architecture that has redundancies necessary to satisfy the safety rules for designing systems for aircraft.

To limit the increase of aerodynamic drag inherent in the operation of the device for controlling the torque around the yaw axis GZ, in particular during the cruising phases of flight that are most often the long phases of flight during which an increase of aerodynamic drag implies a noticeable increase in fuel consumption, the device for controlling the torque around the yaw axis GZ has a cruise mode in which the devices for drag generation are commanded to create an aerodynamic drag on only a single side of the aircraft at a time when a yaw torque has to be created.

As the case may be, when the aerodynamic drag conditions are less important for fuel consumption, for example for relatively short phases of flight such as the approach phases before landing, and if improved dynamics of aircraft control are desired, the device for controlling the torque around the yaw axis GZ advantageously has a dynamic mode in which the drag-generating devices are commanded simultaneously in opposite directions, with one increasing the aerodynamic drag at one end of the wing while the other reduces this drag at the other end of the wing.

To permit the use of this dynamic mode, the drag-generating devices are commanded into an intermediate neutral position for each to create an essentially middle aerodynamic drag between a minimal drag of zero setting and a maximum drag, essentially equal in intensity on the two sides of the aircraft so as not to generate torque around the yaw axis GZ, and are commanded asymmetrically relative to the intermediate neutral position to create an aerodynamic drag difference between the two sides of the aircraft (1) when a yaw torque is desired.

In a preferred form of embodiment, a wing of the aircraft is used as a lifting surface because of its larger root, and the aerodynamic forms that have the aerodynamic drag-generating devices are fastened to the wingtips.

The disclosed embodiments also relate to a winglet incorporating an aerodynamic drag generator that can be fastened to an aerodynamic lifting surface of an aircraft.

BRIEF DESCRIPTION OF THE DRAWINGS

The aircraft pursuant to the disclosed embodiments is described with reference to the Figures, which show schematically:

FIG. 3b: an illustration of the structure and the systems used in the device of FIG. 3a;

FIG. 5a: a view of a device with a full flap and central axis;

FIGS. 5b and 5c: views of a device with two full flaps and central axes;

FIGS. 6a, 6b, and 6c: views of devices with an internal flap and central axis,

FIG. 6a central axis, FIG. 6b front axis, FIG. 6c rear axis;

FIGS. 7a, 7b, and 7c: views of devices with two flaps of the spoiler type with two front-axis flaps (FIG. 7a), two rear-axis flaps (FIG. 7b), and one front-axis flap and one rear-axis flap (FIG. 7c);

DETAILED DESCRIPTION

Figure 1:
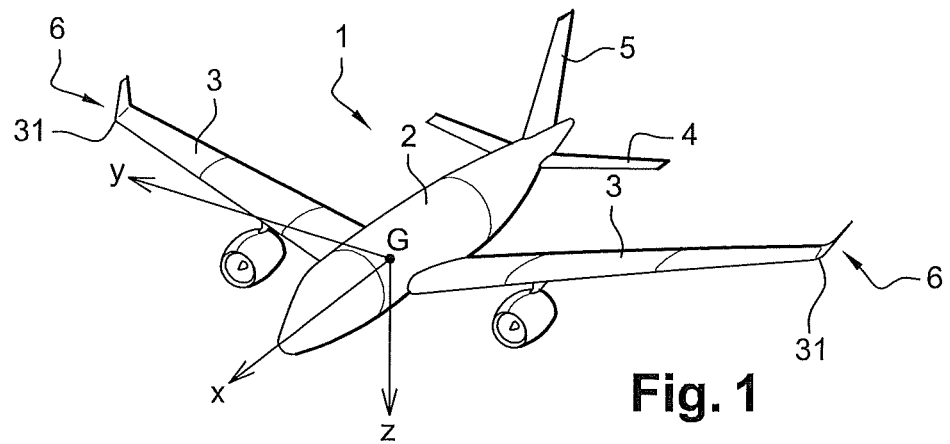
FIG. 1: a perspective view of an example of an aircraft showing the known architecture used by the aircraft of the disclosed embodiments.

FIG. 1 illustrates an example of an aircraft 1 corresponding to an overall architecture of an aircraft to which the disclosed embodiments are applied.

The aircraft 1 has principally a fuselage 2, a wing 3 fastened to the fuselage, in the example illustrated at a central section of the fuselage along a longitudinal direction, and for example a horizontal 4 and vertical 5 tail fin assembly fastened to the fuselage at a section of the fuselage behind the wing 3.

The aircraft 1 is associated for the needs of the description with a conventional frame of reference defined by three orthogonal directions:

an X direction parallel to a longitudinal axis of the aircraft, parallel to an axis of the fuselage oriented positively toward the front of the aircraft in the direction of motion in flight;

a Z direction perpendicular to the X direction and oriented positively toward the bottom of the aircraft; and a Y direction perpendicular to an XZ plane determined with the X and Z directions, oriented positively toward the right of the aircraft.

An XZ plane passing through an axis of the fuselage in this example constitutes a vertical plane of symmetry, and an XY plane forms a horizontal plane in the frame of reference of the aircraft.

The expressions relative to position or direction in the description have the same meanings that they have in a frame of reference of the aircraft, specifically:

forward or toward the front signifies the direction of positive X, and rear or toward the rear means in the direction of negative X;

below or downward signifies the direction of positive Z, and above or upward means in the direction of negative Z;

at or to the right signifies in the direction of positive Y, and at or to the left means in the direction of negative Y, on a side signifying either the side of positive X or of positive Y, as the case may be.

The X, Y, and Z directions combined with a center of gravity G of the aircraft also determine the principal axes of rotation of the aircraft generally used in conducting the flight:

rolling around a GX axis of the X direction, the pitch around a GY axis of the Y direction, and yaw around a GZ axis of the Z direction.

The aircraft 1 also has aerodynamic forms 6 fastened to each end 31 of the wing 3.

These aerodynamic forms 6 in the case of the aircraft of the disclosed embodiments are not parts of the wing 3 but are added in fixed fashion to the wing.

For each wingtip 3, these aerodynamic forms have one or more profiled aerodynamic surfaces 7 inclined relative to the wing 3, giving them individual characteristics of small wings or airfoils or "ailettes", also called winglets when they are placed at the end of a wing, whose inclination relative to the wing brings them closer to a direction perpendicular to the horizontal XY axis of the frame of reference of the aircraft, while remaining oriented so that the aerodynamic profiles of these winglets are essentially in the general direction of the flow of the aircraft in flight, also the direction of the X axis of the aircraft frame of reference.

Figure 2A:
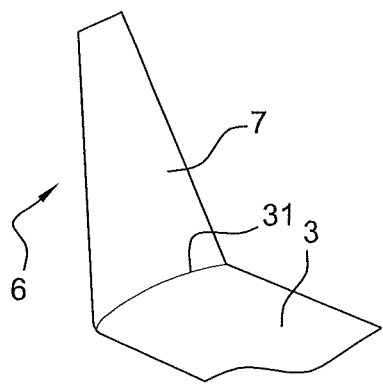
FIGS. 2a, 2b, 2c: perspective views of different models of inclined wingtip aerodynamic surfaces.
Figure 2B:
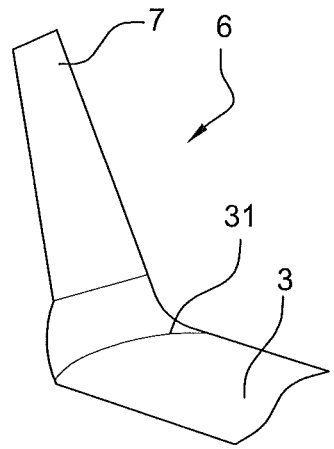
Figure 2C:
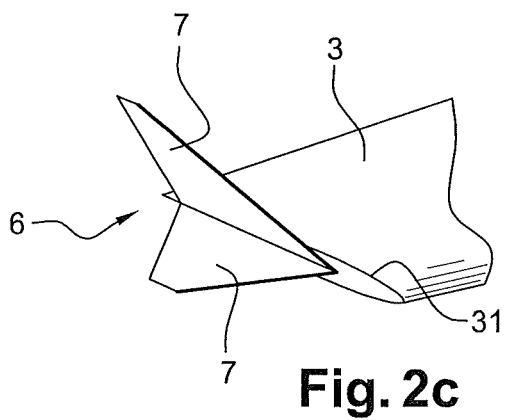

In line with the desired effect on the aerodynamic functioning of the wing at the ends 31 of which they are fastened, the winglets have very variable shapes, inclinations, and dimensions, and FIGS. 2a, 2b, and 2c illustrate examples of known shapes of winglets, with these dimensions and these shapes depending on the choice of design and optimization calculations specific for the wing being considered and produced by the aircraft designer.

FIG. 2a corresponds to a winglet 7 generally with a relatively large surface, with its junction with the end 31 of the wing extending over an entire wingtip chord.

FIG. 2b corresponds to a winglet 7 joined to the end 31 of the wing by an intermediate curve to obtain a continuous geometry between the wingtip and the winglet with a winglet having a reduced chord compared with a wingtip chord.

FIG. 2c corresponds to a double winglet 7 extending above and below the wing 3.

A description of the disclosed embodiments is given considering the form illustrated in FIG. 2a, but the disclosed embodiments are suitable with no problems for other possible forms of winglets, illustrated or not illustrated, or for other forms of winglets of aerodynamic forms 6 fastened to the wing 3.

In the aircraft of the disclosed embodiments, the winglets 7 with aerodynamic forms 6 have generators of aerodynamic drag 72 on each side of the aircraft relative to the vertical plane of symmetry XZ, for which the aerodynamic drag generated can be modulated.

These generators 72 of aerodynamic drag are generally of the air brake type.

The installation of such generators on the winglets 7 appears contrary to the desired objective of the known winglets of aircraft wings for which a reduction of the aerodynamic drag of the wing 3 is obtained with the help of said winglets.

Such an installation is also contrary to the principles of installation of air brakes, which are mounted as close as possible to the axis of the aircraft 1 to avoid parasitic aerodynamic torques, either on the fuselage 2 or on the wing 3, preferably in areas close to the fuselage.

According to the disclosed embodiments, the generators 72 of aerodynamic drag situated on the winglets 7 at each end 31 of the wing 3 are put to use asymmetrically, in other words said generators are used to create different aerodynamic drags when necessary between the two wingtips 3, the effect of which is to cause an aerodynamic torque around the yaw axis GZ, the direction of which is determined by the algebraic sign of the difference between the modulus of the drag generated at a first wingtip, for example the right extremity of the aircraft wing, and that of the drag generated at the second extremity, the left extremity of the wing in the example.

The efficacy of a variation of the drag of a winglet on the yaw torque is optimal as a function of the maximum distance of the ends 31 of the wing 3 relative to the axis of the fuselage 2, and accordingly from the center of gravity G of the aircraft.

Besides the fact of the possible progressivity of a creation of aerodynamic drag by the drag generators 72, examples of embodiment of which are described below, the yaw torque can be controlled precisely, which is particularly desirable because of the efficacy of these drag generators on the yaw of the aircraft.

In a first mode of use, advantageously in a mode corresponding to cruising phases of flight of the aircraft for which a minimal aerodynamic drag is desired, the drag generators 72 are placed in a position for which no yaw torque around the GZ axis is sought, and so as not to generate aerodynamic drag.

This position of the aerodynamic drag generators is called the zero-setting position.

In this first mode, called the cruising mode of use, only the generator situated on one side of the aircraft is driven to generate an aerodynamic drag on the suitable side when a yaw torque is desired, with the generator located on the other side of the aircraft being kept in the zero-setting position.

In a second mode of use, advantageously in a mode corresponding to flight phases of the aircraft for which improved manageability is desired, preferably at reduced drag, the drag generators 72 of the two sides of the wing are commanded simultaneously to increase the drag on one side of the aircraft and to reduce that on the other side, around a common intermediate position considered to be a neutral position in this mode of symmetrical drag generation, with drag intensity essentially in the middle between the minimal drag at the zero setting and maximum generated drag.

Thus, the torque obtained is the resultant of the combination of the torques from each of the drag generators on the two sides of the aircraft.

Higher dynamic pilot control is then obtained in this mode, called the dynamic mode, by a simultaneous combination of the effects of increasing the drag relative to the intermediate position by the drag generators 72 at one of the wingtips on one side of the aircraft and reducing the drag relative to the intermediate position by the drag generator 72 at the other wingtip on the opposite side of the aircraft.

Such a dynamic mode proves to be advantageous under flight conditions at reduced speeds for which the aerodynamic drag of the drag generators is reduced because of a low dynamic pressure of the aerodynamic flow.

Figure 3A:
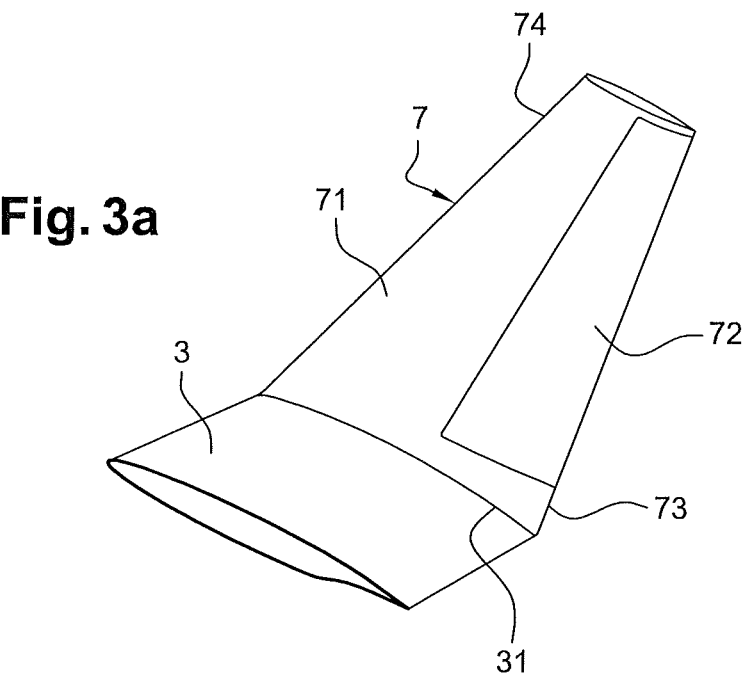
FIG. 3a: an example of an aerodynamic drag-generating device according to an embodiment of the disclosed embodiments in the zero-setting position.

As illustrated in FIG. 3a of an example of a drag generator at one of the ends of the wing 3, the winglet 7 has a structural section 71 fixed relative to the wing 3 and a movable section 72, movable relative to said fixed structural section.

The movable section 72 in this mode of embodiment has principally a movable flap in a rear section of the winglet 7, in other words beside a trailing edge 73 of the winglet 7, hinged at its forward section to the fixed structural part 72, between a leading edge 74 of the winglet 7 and the trailing edge 73.

When the flap is in the position not generating drag, called the zero setting, as shown in FIG. 3a, the geometry of the winglet 7, the combination of the fixed structural section 71 and the movable flap 72, corresponds to that of a conventional winglet, for example whose geometry is optimized to reduce the aerodynamic drag of the wing 3 in the cruising flight condition.

The movable flap 72 is such that a setting of said flap has the effect of generating an aerodynamic drag, becoming more intense as the setting of said movable flap is made larger, generating a yaw torque on the aircraft when a similar setting, symmetrical or asymmetric but generating a symmetrical drag, is not applied to a movable flap situated at the other end of the wing.

In such a winglet 7, the strength and rigidity of the structure must be sufficient to assure the functioning of the movable flap 72 without excessive deformation.

Thus the fixed structural section 71 preferably has a casing structure between a front spar 711 located beside the leading edge 75 of the winglet and a rear spar 712 located in front of the movable flap 72.

The movable flap 72 extends along the span of the winglet 7 between a root rib 713 located beside the wing 3 and an end rib 714 located on the winglet opposite the wing.

In a preferred mode of embodiment, in particular when the dimensions of the winglet 7 do not permit easy integration of linear drivers, the movable flap 72 has a driving shaft 721 whose axis is oriented in the direction of a span of the winglet, hinged to rotate relative to the fixed structural section 71 at bearings close to the root ribs 713 and end ribs 714, and one or more rotational drivers 722, 723, for example hydraulic or electric, powered by power lines 74, setting the movable flap 72 in rotation.

Management of the setting angles of the movable flaps 72 is preferably provided by flight control computers by a device for controlling the torque around the GZ yaw axis, considering the interactions between the different aircraft fins, the modes of stabilization in action, and the orders of the pilots.

Preferably in the choice of the direction of setting of the movable flap 72, the designer of the flight command rules will take into account the secondary effects of the setting of the movable flap, for example a force in the Y direction and/or a torque around the GX roll axis, such that the consequences of these secondary effects are minimized if they are not desirable or maximized if these secondary effects are beneficial considering a voluntary maneuver made by the aircraft 1.

The arrangement described for producing the drag generator associated with a winglet is able to take diverse forms of embodiment.

Figure 4A:
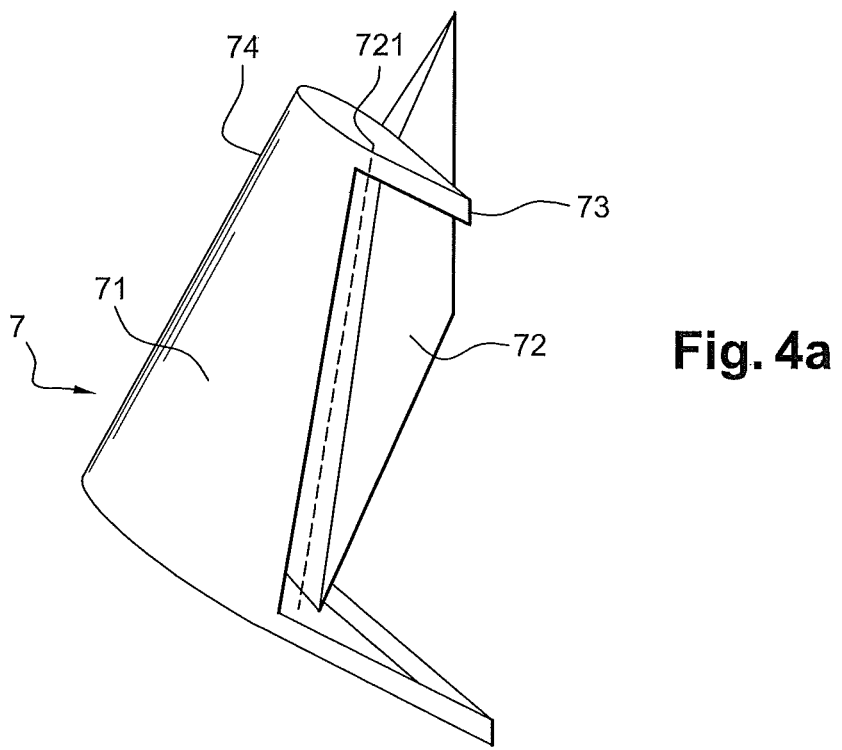
FIG. 4a: a view of the device of FIG. 3a in a non-zero setting position.

FIG. 4a corresponds to the mode of embodiment described previously, brought back by way of reference for other modes of embodiment shown schematically in the drawings of the series of FIGS. 4, 5, 6, and 7 for different variants, whose technical structural details are similar and are neither shown nor described again.

Figure 3B:
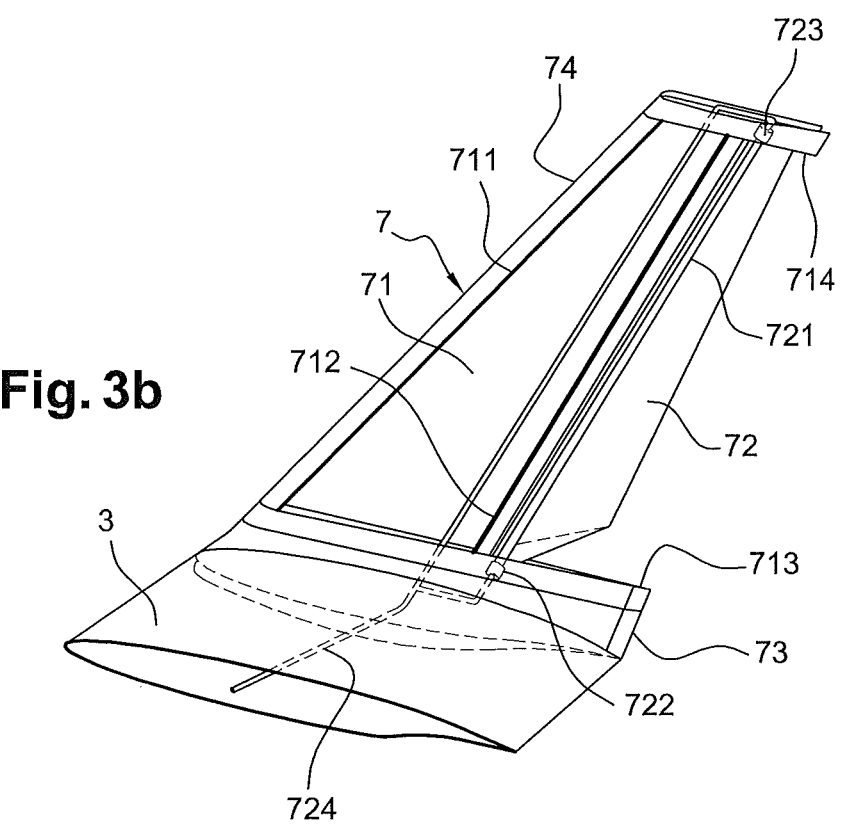
Figure 4B:
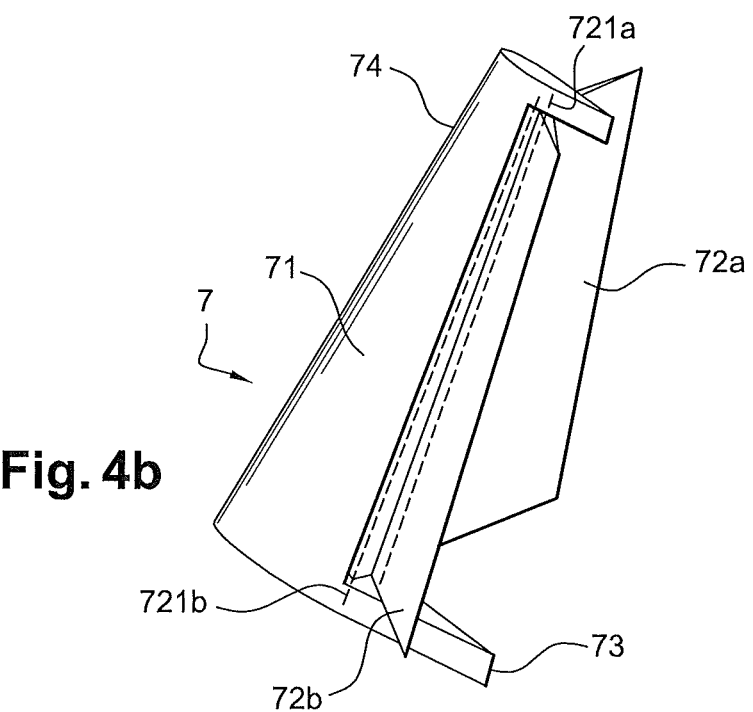
FIG. 4b: a view of a device with two flaps hinged at the front in a crocodile form.

In a mode of embodiment called full flap and forward axis, to which belong the mode illustrated in FIGS. 3a, 3b, and 4a, a first variant shown in FIG. 4b makes use of two flaps 72a and 72b.

The two flaps 72a, 72b are hinged in their front sections on the side of their leading edges at axes of rotation 721a, 721b respectively, in a way similar to the mode that has a single full flap.

In a joined position and at zero setting, the two flaps 72a, 72b reconstitute the form of the winglet adapted to cruising flight of the aircraft.

To generate an aerodynamic drag, the two flaps 72a and 72b are set in opposite directions so as to be separated from one another.

This functional arrangement called the crocodile provides for creating the desired drag while minimizing the secondary effects, in particular those linked with the lateral lift of the winglet generated by setting a single flap.

In a particular form of this mode of embodiment, the two crocodile flaps 72a, 72b are controlled independently of one another so as to be able to combine at differential settings a common average non-zero central setting.

In variants of embodiment, said full flaps and central axes illustrated in FIGS. 5a on the one hand and 5b and 5c on the other hand, the flap(s) 72, 72c, 72d are each hinged at a central section, around the axis 721, 721c, 721d for each flap, respectively, located between a leading edge and a trailing edge of the flap in question.

In these cases, the use of a central axis located advantageously near an axis with zero or low hinge torque of each flap, permits limiting the power of the drivers that produce the movement of the flap.

When two full flaps 72c, 72d with central axes are used, said two flaps are placed one behind the other so that when they are aligned in a zero-setting position they are then equivalent to the single flap 72 at zero setting of the one-flap embodiment, and provide the shape of the winglet in the configuration suitable for cruising flight of the aircraft.

The two full flaps 72c, 72d of the same winglet 7 are preferably set in opposite directions, and as the case may be they are mechanically linked to be able to be moved in rotation around their respective axes 721c, 721d, by the same set of drivers.

Depending on the secondary effects desired, or on the contrary those wanting to be avoided, during the setting of the two full flaps they can be set in one direction or in the opposite direction as illustrated in FIGS. 5b and 5c, with the settings able to have opposite algebraic signs between the two flaps as illustrated, or to have the same algebraic sign so that the central planes of the two flaps remain essentially parallel, a situation not shown.

In a similar variant not shown, more than two full flaps are arranged individually relative to the others on the winglet in a way similar to the two full flaps 72c, 72d, with their settings combined or differential permitting the drag of the winglet to be modulated.

In other variants, called variants with internal flap allowing a more rigid winglet structure to be produced, the flap 72 is internal to the winglet 7, in other words the flap occupies an opening 75 through the fixed structural section 71 of the winglet, delimited toward the front by a section of the leading edge 715 of the fixed structural section 71, toward the rear by a section of the trailing edge 716, and toward the root and toward the tip by root and end ribs 713 and 714, respectively, of the fixed structural section 71.

In these variants the flap 72 has a central axis 721, the case illustrated in FIG. 6a, a front axis, the case illustrated in FIG. 6b, or a rear axis, the case illustrated in FIG. 6c.

According to variants not shown, as the structure of the winglet permits, two or more internal flaps are arranged in the space 75 in a way similar to the arrangement of the flaps 72c, 72d of the variant with full flaps and central axis illustrated in FIGS. 5b and 5c.

In other variants of embodiment, called spoiler flaps, the winglet 7 has an essentially closed structure and one or more flaps with relatively small thickness are hinged to the winglet so that in the zero-setting position the flaps are integrated in the surface covering of the winglet to generate no perceptible drag.

This type of installation corresponds to the principle of installation of lift-destroying flaps, or spoilers, installed on aircraft wings.

A winglet is provided with a flap on only one face of the aerodynamic surface of said winglet, or as illustrated in FIGS. 7a to 7c, on the two faces.

Each flap 72e, 72f is hinged to the structure of the winglet 7 around an axis 721e, 721f located in front of the flap, the case illustrated in FIG. 7a, or around an axis located behind the flap, the case illustrated in FIG. 7b, or one flap 72e is hinged around an axis 721e located in front of said flap and the other flap 72f around an axis 721f located behind said flap, the case illustrated in FIG. 7c.

The choice of the type of installation is dictated by structure considerations and arrangement of the drivers suitable for each embodiment.

In forms of embodiment not illustrated, the flaps 72, 72a to 72f, are provided with elements that favor the creation of aerodynamic drag when the flaps are not at zero setting, for example turbulence generators, flap panels in the form of perforated gratings, etc., which are preferably arranged so as not to create perceptible additional drag when cruising when the flaps are at zero setting.

The aerodynamic forms 6 that have winglets 7 provided with aerodynamic drag generators 72 of the aircraft of the disclosed embodiments in the variants of embodiment (not shown) are fastened to aerodynamic lifting surfaces whose function is similar to a wing, in other words essentially horizontal surfaces in the frame of reference of the aircraft and extending essentially symmetrically relative to the vertical plane of the aircraft such as a rear horizontal stabilizer or a front horizontal stabilizer called a canard.

In other variants, the aerodynamic forms 6 that have winglets 7 provided with aerodynamic drag generators 72 are fastened to the aerodynamic lifting surfaces, each between an end of said aerodynamic lifting surface and the vertical plane of symmetry XZ of the aircraft, preferably close to the end of said lifting surfaces to benefit from a maximum lever arm.

Figure 8:
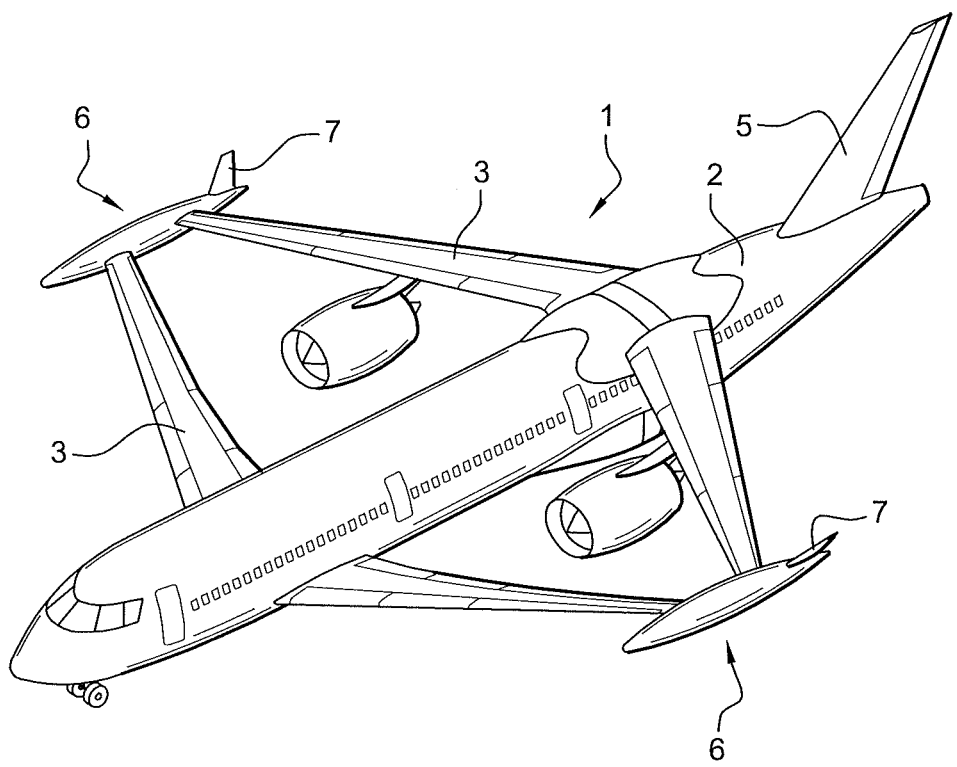
FIG. 8: an example of implementation of the disclosed embodiments on an aircraft structure with tandem wings.

FIG. 8 shows an example of these variants in which the aerodynamic forms 6 fastened to the ends of two wings, themselves fastened to the fuselage in a configuration called a tandem configuration, are spindle-shaped and provide structural liaisons between the two wings.

The winglets 7 that have aerodynamic drag generators 72 in this case are fastened to the said spindle-shaped forms and in the zero-setting position said winglets improve the aeroelastic behavior of the wings.

The disclosed embodiments permit producing an aircraft whose yaw control is embodied by an asymmetric aerodynamic drag control, the intensity of which is limited depending on the use of a lever arm maximized relative to the center of gravity of the aircraft.

Depending on detailed modes of embodiment, the generation of drag is accomplished by devices integrated in wingtip winglets that are also put to use to improve the aerodynamic performance of the wing, with installation of the drag-generating device thus involving only a minimal installation penalty.

The disclosed embodiments permit reducing the dimensions of, or even eliminating, conventional means used to control the yaw of the aircraft, in particular the directional rudder.

The invention claimed is:

1. An aircraft comprising:
a fuselage;
at least a first essentially horizontal lifting surface extending on a first side of a vertical frame of reference of the aircraft, and at least a second essentially horizontal lifting surface extending on a second side of the vertical frame of reference of the aircraft, wherein the vertical axis passes through a center of gravity G of the aircraft to determine a yaw axis GZ, and
first and second winglets fastened to the first and second lifting surfaces at a non-zero distance from a vertical plane of symmetry XZ of the aircraft, respectively, each of the first and second winglets comprising a first surface extending between the leading edge and the trailing edge and a second surface, opposite to the first surface, extending between the leading edge and the trailing edge, each winglet comprising a through opening delimited between the leading and trailing edges of the winglet and extending between the first and second surfaces of the winglet,
the opening substantially occupied by a movable flap having an axis of rotation in a first position thereof, wherein the movable flap extends substantially throughout the through opening in the first position such that a first surface of the movable flap is flush with the first surface of the winglet and a second surface of the movable flap is flush with the second surface of the winglet such that dimensions of the movable flap substantially correspond to dimensions of the through-opening, the movable flap rotatable to extend from a first side of the winglet and a second side of the winglet;
wherein each movable flap is operable to generate controlled drag to produce a different aerodynamic drag on each side of the vertical plane of symmetry XZ of the aircraft, so as to generate a yaw torque on the aircraft around the yaw axis GZ.

2. The aircraft according to claim 1, wherein the movable flap has a leading edge axis of rotation.

3. The aircraft according to claim 1, wherein the movable flap has a central axis of rotation.

4. The aircraft according to claim 1, wherein the movable flap has a trailing edge axis of rotation.

5. The aircraft of claim 1, wherein the axis of rotation of the movable flap extends along a longitudinal direction of the corresponding winglet.

6. A winglet configured to be fastened to the end of an aerodynamic lifting surface of an aircraft comprising: a through opening delimited between a leading and trailing edge of the winglet, the opening occupied by a movable flap having an axis of rotation and first and second edges, the movable flap rotatable to extend from a first side of the winglet and a second side of the winglet such that the first edge of the flap extends from the first side of the winglet and the second edge of the flap extends from the second side of the winglet.

7. A winglet configured to be fastened to the end of an aerodynamic lifting surface of an aircraft, the winglet comprising:
a through opening delimited between a root rib proximal to the end of the aerodynamic lifting surface and an end rib distal to the end of the aerodynamic lifting surface, the root rib and the end rib extending between a leading edge of the winglet and a trailing edge of the winglet;
wherein the opening is occupied by a first movable flap having an axis of rotation and a first edge, the first movable flap rotatable about the axis of rotation, and configured to assume at least first and second positions;
wherein in the first position, the first movable flap is flush with the root rib and the end rib and the first edge of the first movable flap is flush with the trailing edge of the winglet;
wherein in the second position, the first movable flap is positioned at a predetermined angle relative to the winglet;
wherein the first movable flap comprises a second edge;
wherein the axis of rotation of the first movable flap is defined intermediate of the first and second edges of the first movable flap; and wherein in the second position, the first movable flap is configured to rotate about the axis of rotation thereof such that the first edge of the first movable flap extends from a first side of the winglet and the second edge of the first movable flap extends from a second side of the winglet.

8. The winglet of claim 7, further comprising a second movable flap having an axis of rotation and a first edge, the second movable flap rotatable about the axis of rotation thereof and configured to assume at least first and second positions;
   wherein in the first position, the second movable flap is flush with the root rib and the end rib and the first edge is flush with the trailing edge of the winglet; and
   wherein in the second position, the first movable flap is positioned at a first predetermined angle relative to a first surface of the winglet and the second movable flap is positioned at a second predetermined angle relative to a second surface of the winglet.

9. The winglet of claim 7, further comprising a second movable flap having an axis of rotation;
   wherein the axes of rotation of the first and second movable flaps are generally parallel to one another in a plane of the winglet.

* * * * *